United States Patent
Funayama et al.

(10) Patent No.: US 7,304,825 B2
(45) Date of Patent: Dec. 4, 2007

(54) CCP-CCP-GMR HEAD ASSEMBLY WITH GOOD OPERATING LIFE, AND MAGNETIC RECORDING/REPRODUCING APPARATUS THEREWITH

(75) Inventors: Tomomi Funayama, Hino (JP); Kohichi Tateyama, Yokohama (JP); Masayuki Takagishi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 372 days.

(21) Appl. No.: 10/985,886

(22) Filed: Nov. 12, 2004

(65) Prior Publication Data

US 2005/0190510 A1    Sep. 1, 2005

(30) Foreign Application Priority Data

Feb. 26, 2004    (JP)    ............................. 2004-052362

(51) Int. Cl.
*G11B 5/39*    (2006.01)
(52) U.S. Cl. ................................... 360/324
(58) Field of Classification Search ............. 360/324.1, 360/324.2, 324, 317, 322
See application file for complete search history.

(56) References Cited

U.S. PATENT DOCUMENTS

| | | | |
|---|---|---|---|
| 6,163,426 A * | 12/2000 | Nepela et al. ................. | 360/66 |
| 6,560,077 B2 | 5/2003 | Fujiwara et al. .......... | 360/324.1 |
| 6,724,582 B2 | 4/2004 | Funayama et al. ....... | 360/324.1 |
| 7,002,781 B2 * | 2/2006 | Sugawara ............... | 360/324.11 |
| 2004/0042127 A1 | 3/2004 | Hoshiya et al. .......... | 360/324.1 |
| 2004/0201929 A1 * | 10/2004 | Hashimoto et al. ...... | 360/324.1 |
| 2006/0077595 A1 * | 4/2006 | Yuasa et al. ............. | 360/324.1 |

FOREIGN PATENT DOCUMENTS

| EP | 0 866 453 B1 | 9/2002 |
|---|---|---|
| JP | 5-334607 | 12/1993 |

OTHER PUBLICATIONS

Ching Tsang et al., "Design, Fabrication & Testing of Spin-Valve Read Heads for High Density Recording," IEEE Transaction on Magnetics, vol. 30 (No. 6), p. 3801-3806, (Nov. 1994).
Masamichi Saito et al., "Narrow Track Current-Perpendicular-To-Plane Spin Valve GMR Heads," IEEE Transactions on Magnetics, vol. 40 (No. 1), p. 207-212, (Jan. 2004).

(Continued)

*Primary Examiner*—Julie Anne Watko
(74) *Attorney, Agent, or Firm*—Pillsbury Winthrop Shaw Pittman LLP (57) ABSTRACT

Disclosed is a CCP-CPP-GMR head assembly which has: a CCP-CPP-GMR head that includes at least a current control layer having as a microstructure a plurality of truncated cone electric conductors with axes the same as a current direction and an insulator filling between the plurality of truncated cone electric conductors, and in which a surface on which a larger-area basal plane of the plurality of truncated cone electric conductors is greater in number is a first surface of the current control layer and a surface of an opposite side of the first surface is a second surface of the current control layer; and a sense current source providing the CCP-CPP-GMR head with a sense current that flows from the second surface to the first surface, a magnetic recording/reproducing apparatus having such a head, and a specification method of an appropriate sense current direction of the CCP-CPP-GMR head.

4 Claims, 7 Drawing Sheets

OTHER PUBLICATIONS

Atsushi Tanaka et al., "Readout Performance of Confined-Current-Path Current-Perpendicular-to-Plane Heads," IEEE Transactions on Magnetics, Vol. 40 (No. 1), p. 203-206, (Jan. 2004).

Atsushi Tanaka et al., "Spin-Valve Heads in the Current-Perpendicular-to-Plane Mode for Ultrahigh-Density Recording," IEEE Transactions on Magnetics, vol. 38 (No.1), p. 84-88, (Jan. 2002).

* cited by examiner

| | APPARATUS NUMBER | POLARITY SWITCHING CIRCUIT | HEAD 33 | | HEAD 34 | | OUTPUT AFTER 24HOUR ACCELERATED TEST | |
|---|---|---|---|---|---|---|---|---|
| | | | | CURRENT POLARITY | | CURRENT POLARITY | HEAD 33 | HEAD 34 |
| EXAMPLE 1 | 1 | YES | HEAD A | + | HEAD A | + | −0.5% | −0.6% |
| EXAMPLE 2 | 2 | YES | HEAD B | − | HEAD B | − | −0.3% | −0.7% |
| COMPARATIVE EXAMPLE 1 | 3 | NO | HEAD A | + | HEAD A | + | −0.7% | −0.2% |
| COMPARATIVE EXAMPLE 2 | 4 | NO | HEAD B | + | HEAD B | + | −16% | −14% |

FIG. 6

| | APPARATUS NUMBER | POLARITY SWITCHING CIRCUIT | HEAD 33 | CURRENT POLARITY | HEAD 34 | CURRENT POLARITY | OUTPUT AFTER 24HOUR ACCELERATED TEST HEAD 33 | OUTPUT AFTER 24HOUR ACCELERATED TEST HEAD 34 |
|---|---|---|---|---|---|---|---|---|
| EXAMPLE 3 | 5 | YES | HEAD A | + | HEAD B | − | −0.4% | −0.2% |
| COMPARATIVE EXAMPLE 3 | 6 | NO | HEAD A | + | HEAD B | + | −0.3% | −18% |

FIG. 7

CCP-CCP-GMR HEAD ASSEMBLY WITH GOOD OPERATING LIFE, AND MAGNETIC RECORDING/REPRODUCING APPARATUS THEREWITH

CROSS-REFERENCE TO THE INVENTION

This application is based upon and claims the benefit of priority from the prior Japanese Patent Application No. 2004-52362, filed on Feb. 26th, 2004; the entire contents of which are incorporated herein by reference.

BACKGROUND

1. Field of the Invention

The present invention relates to a confined current path-current perpendicular to plane-giant magnetoresistive (hereinafter referred to as the "CCP-CPP-GMR") head assembly which is a part having a CCP-CPP-GMR head, a magnetic recording/reproducing apparatus having such a head, and a specification method of an appropriate sense current direction of the CCP-CPP-GMR head, more particularly to the CCP-CPP-GMR head assembly in view of the prolonged operating life, a magnetic recording/reproducing apparatus having such a head, and the a specification method of an appropriate sense current direction of the CCP-CPP-GMR head.

2. Description of the Related Art

A composite head which has a reading (reproducing) head using a magnetoresistance effect (MR effect) is used in many magnetic recording/reproducing apparatuses such as magnetic disc apparatuses. A common structure of such a reading head is that a predetermined sense current (direct current) is flowing in the head and a change of a magnetic field from a medium to the head (more specifically, a written magnetic field) is recognized as a change of a voltage by the sense current. The voltage changes because a resistance changes, by the magnetoresistance effect, according to the magnetic field.

An example of a way to give the sense current to the MR head in a magnetic recording apparatus is disclosed in Japanese Patent Laid-open Application No. Hei 5-334607 (Patent document 1). In the above patent document, providing a sense current switching circuit for switching a polarity of the sense current is disclosed. It is stated that conducting switching of the polarity at any arbitrary intervals in such a structure restrains electromigration which occurs microscopically inside the head so as to prolong a head operating life. Incidentally, the head related to the above description is not a CCP-CPP-MR head or a CCP-CPP-GMR head.

[Patent document 1] Japanese Patent Laid-open Application No. Hei 5-334607 (FIG. 1, paragraph 0007, paragraph 0011, claim 12)

SUMMARY

Sample analysis reveals that a microstructure of a CCP-CPP-GMR head, in particular a structure of a current control layer as an essential part thereof, is not formed to be a symmetrical structure with regard to surfaces parallel to the layer. Additionally, study by inventors reveals that a direction of asymetricity differs depending on a manufacturing method. Characteristics of the CCP-CPP-GMR head with the current control layer of the above structures are studied, and it is found that an operating life differs significantly depending on which polarity a sense current is in relation to the direction of asymetricity of the current control layer.

The present invention is made in view of the above circumstances and an object thereof is, in a CCP-CPP-GMR head assembly as a part having the CCP-CPP-GMR head, a magnetic recording/reproducing apparatus having such a head, and a specification method of an appropriate sense current direction of the CCP-CPP-GMR head, to provide a CCP-CPP-GMR head assembly in which a satisfactory operating life can be secured, a magnetic recording/reproducing apparatus having such a head, and a specification method of an appropriate sense current direction of the CCP-CPP-GMR head.

In order to solve the above problem, a CCP-CPP-GMR head assembly according to an aspect of the present invention includes: a CCP-CPP-GMR head that has at least a current control layer having as a microstructure a plurality of truncated cone electric conductors with axes substantially the same as a current direction and an insulator filling between the plurality of truncated cone electric conductors, and in which a surface on which a larger-area basal plane of the plurality of truncated cone electric conductors is greater in number is a first surface of the current control layer and a surface of an opposite side of the first surface is a second surface of the current control layer; and a sense current source providing the CCP-CPP-GMR head with a sense current so that the electric current flows from the second surface to the first surface of the current control layer.

More specifically, the CCP-CPP-GMR head of the CCP-CPP-GMR head assembly includes the current control layer which has, as the microstructure, the plurality of truncated cone electric conductors with axes substantially the same as the current direction and the insulator filling between the plurality of truncated cone electric conductors. Additionally, when the surface on which the larger-area basal plane of the plurality of truncated cone electric conductors is greater in number is the first surface of the current control layer and the surface of the opposite side of the first surface is the second surface of the current control layer, the sense current source is provided so that the sense current flows from the second surface to the first surface of the current control layer.

It is experimentally verified that according to a sense current supply securing such a sense current polarity the operating life is significantly prolonged compared with a case of the polarity of an opposite direction. Though a physical analysis of a mechanism for the prolonged operating life is incomplete, it can be considered that a sense current in the opposite direction brings the current control layer a change which deteriorates a magnetoresistance effect while at use in the above current polarity the change of the current control layer which deteriorates the magnetoresistance effect hardly occurs. Incidentally, on "a surface on which a larger-area basal plane of the plurality of truncated cone electric conductors is greater in number", in most cases, the larger-area basal planes are a significant majority, though depending on manufacturing variation.

Also, a magnetic recording/reproducing apparatus according to an aspect of the present invention is an apparatus which includes at least the above-described CCP-CPP-GMR head and further has a recording/reproducing processing circuit and a servomechanism. Therefore, it is possible to secure the sufficient operating life as the magnetic recording/reproducing apparatus.

Also, a specification method of the appropriate sense current direction of the CCP-CPP-GMR head according to an aspect of the present invention includes: providing the CCP-CPP-GMR head with the sense current of a first polarity to measure a noise level; providing the CCP-CPP-GMR head with the sense current of a second polarity opposite to the first polarity to measure a noise level; and comparing the noise level in the first polarity and the noise level in the second polarity and specifying the sense current direction of the first polarity or the second polarity which gives a smaller noise level between the both noise levels as the appropriate sense current direction.

It is further revealed that there exists a certain correspondence between the microstructure of the current control layer of the CCP-CPP-GMR head and the noise level of this head. More specifically, when the sense current of the polarity with which smaller noise levels are observed is given, in relation to the microstructure of the current control layer, the surface on which the larger-area basal plane of the plurality of truncated cone electric conductors is greater in number being the first surface of the current control layer and the surface of the opposite side of the first surface being the second surface of the current control layer, the sense current flows from the second surface to the first surface of the current control layer.

The above is also experimentally obtained, and a clarification of a detailed mechanism related to the noise level is incomplete. According to the above specification method, the appropriate sense current direction of the CCP-CPP-GMR head to secure the satisfactory operating life can be obtained. Moreover, the appropriate sense current direction of the CCP-CPP-GMR head can be specified with ease in non-destructive way (i.e., without conducting an operating life test or analyzing/specifying the microstructure by adjusting a sample piece).

According to the present invention, it is possible to provide the CCP-CPP-GMR head assembly in which the satisfactory operating life can be secured, the magnetic recording/reproducing apparatus having such a head, and the specification method of the proper sense current direction of the CCP-CPP-GMR head.

DETAILED DESCRIPTION

Description of Embodiments

Embodiments of the present invention will be described with reference to the drawings, but these drawings are presented only for the illustrative purpose and in no respect, are intended to limit the present invention.

As a form of an embodiment in a CCP-CPP-GMR head assembly, in the CCP-CPP-GMR head the truncated cone electric conductor of the current control layer can be Cu (copper), and the insulator of the current control layer can be alumina. This is a possible form as a structure of the current control layer. Such a current control layer can be formed by a process in which Cu/Al stacked film for example is grown by sputtering for example and subsequently this stacked film is oxidation treated to selectively oxidize Al and to change a form of a Cu layer from a film form to a truncated cone form.

As another form of the embodiment, the CCP-CPP-GMR head assembly can also include an inductive write head which is distantly disposed in a vertical direction against the current control layer of the CCP-CPP-GMR head. It is common that a head assembly has a MR head as a read head and an inductive write head as a write head (has so-called composite heads).

As a form of an embodiment in a magnetic recording/reproducing apparatus, a pair of the CCP-CPP-GMR head assemblies can be disposed corresponding to both surfaces of the medium. It is common in a magnetic disc apparatus and the like that a pair of head assemblies are disposed corresponding to both surfaces of the medium.

As a form of an embodiment in a specification method of an appropriate sense current direction of a CCP-CPP-GMR head, measuring a noise level in a first polarity and measuring a noise level in a second polarity can be variably conducted in a range including an electric current value which is used for an actual sense current. According thereto, it is possible to conduct a comparison of the noise level more reliably.

Figure 1:
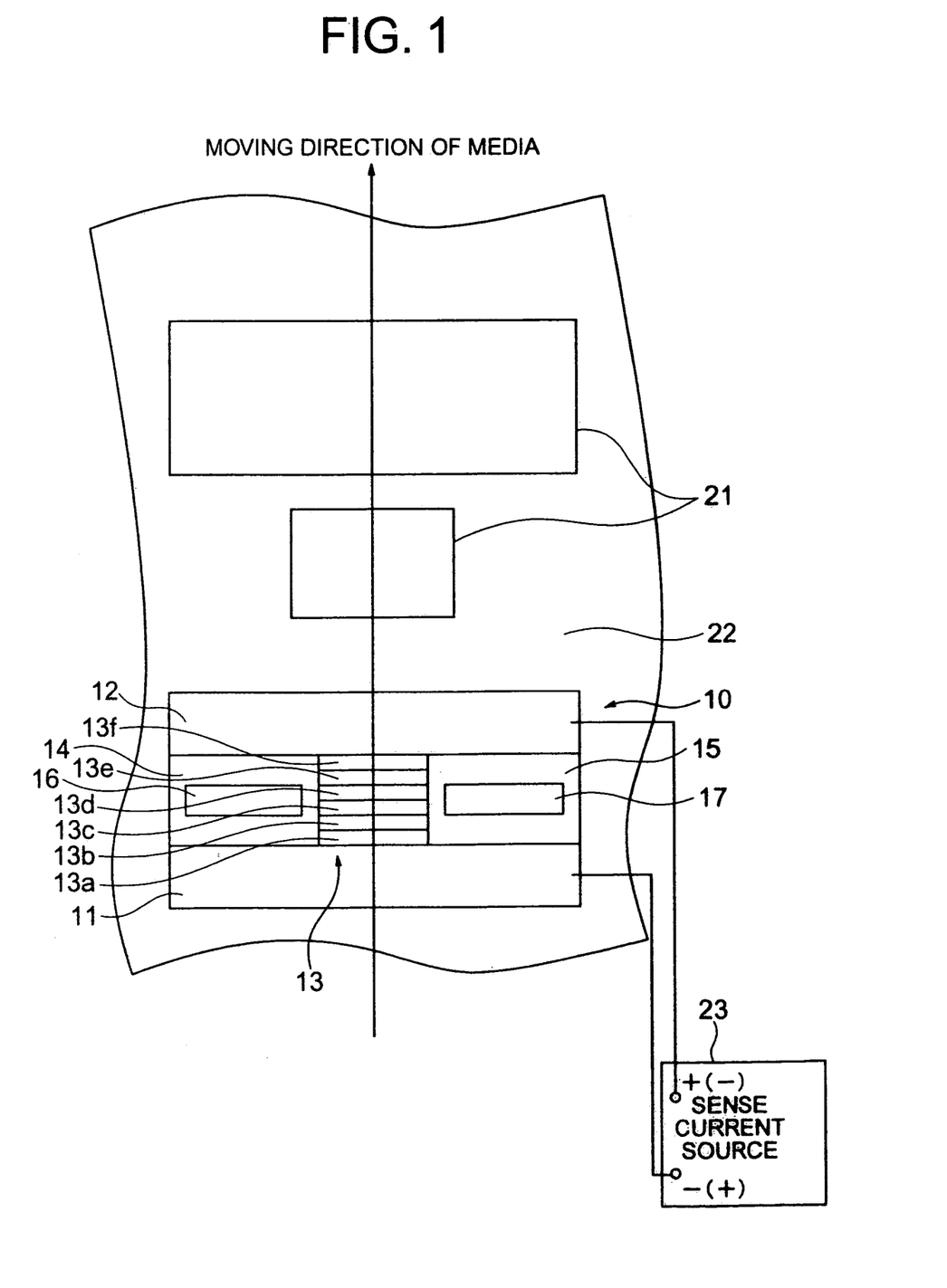
FIG. 1 is a front view schematically showing an enlarged substantial head part of a CCP-CPP-GMR head assembly according to an embodiment of the present invention.

Based on the above, hereinafter embodiments of the present invention will be described with reference to the drawings. FIG. 1 is a front view schematically showing an enlarged substantial head part of a CCP-CPP-GMR head assembly according to the embodiment of the present invention. Here, the front view is a drawing in which a surface of the head assembly which faces the medium (here, a magnetic disc) is viewed from a front.

As shown in FIG. 1, as the substantial head part, the CCP-CPP-GMR head 10 being a read head and an inductive write head 21 being a write head are provided. The inductive write head 21 has a main magnetic pole of a lower side in the drawing and an auxiliary magnetic pole of an upper side in the drawing. An insulator 22 fills between these heads. A direction in which the CCP-CPP-GMR head 10 and the inductive write head 21 are apart substantially matches a direction in which the medium relatively moves when the head assembly is put together as a magnetic recording/reproducing apparatus. The CCP-CPP-GMR head 10, the inductive write head 21, the insulator 22 and so forth are fixed on a slider (not shown).

The CCP-CPP-GMR head 10 has a lower electrode-and-shield layer 11, an upper electrode-and-shield layer 12, a magnetoresistance film 13, insulating layers 14, 15, and bias layers 16, 17. To the lower electrode-and-shield layer 11 and the upper electrode-and-shield layer 12, connections are conducted so that therebetween a sense current of a predetermined polarity and volume is provided from a sense current source 23. The "predetermined polarity" will be described later.

The magnetoresistance film 13 is, with the insulating layers 14, 15, sandwiched between the lower electrode-and-shield layer 11 and the upper electrode-and- shield layer 12 in a layer direction, and is also sandwiched between the insulating layer 14 and insulating layer 15 in a vertical direction against the layer direction. The magnetoresistance film 13 is a film main body which exhibits a magnetoresistance effect. Inside the insulating layers 14, 15, the bias layers 16, 17 are respectively disposed apart from the lower electrode-and-shield layer 11, the upper electrode-and-shield layer 12, and the magnetoresistance film 13. The bias layers 16, 17 are made of hard magnetic substance and have roles of giving bias magnetic fields to the magnetoresistance film 13.

The magnetoresistance film 13 has, from a lower side in the drawing, a base layer 13a, an antiferromagnetic layer 13b, a fixed magnetization layer 13c, a current control layer 13d, a free magnetization layer 13e, and a protective layer 13f. These layers are obtained by growing films by sputtering, for example, on a substrate (not shown) from the lower side in the drawing as a manufacturing process. Incidentally, a size of the magnetoresistance film 13 is approximately, for example, 0.1 μm in a horizontal direction in the drawing (width) and, for example, 20 nm to 30 nm in thickness from the antiferromagnetic layer 13b to the free magnetization layer 13e (substantial part as the magnetoresistance film 13).

Materials of the base layer 13a, the antiferromagnetic layer 13b, the fixed magnetization layer 13c, the current control layer 13d, the free magnetization layer 13e, and the protective layer 13f, as well as the lower electrode-and-shield layer 11 and the upper electrode-and-shield layer 12 are, for example, as follows. The base layer 13a: NiFeCr or Ta, the antiferromagnetic layer 13b: PtMn or IrMn, the fixed magnetization layer 13c and the free magnetization layer 13e: magnetic substance consisting mainly of Ni, Fe, and Co, the current control layer 13d: oxide film containing Cu and Al, the protective layer 13f: Ta or Ru, and the lower electrode-and-shield layer 11 and the upper electrode-and-shield layer 12: NiFe.

Among these films, the current control layer 13d is not simple in terms of a microstructure inside the layer. The current control layer 13d can be obtained by, for example, growing and forming Cu/Al stacked structure by sputtering of each layer and subsequently conducting oxidation treatment as a manufacturing process. In the oxidation treatment, only Al is oxidized to be alumina (insulator) as a consequence, and a layer structure of a lower Cu layer breaks and changes to be numerous columns in a vertical direction. These columns are electric conductors.

Figure 2A:
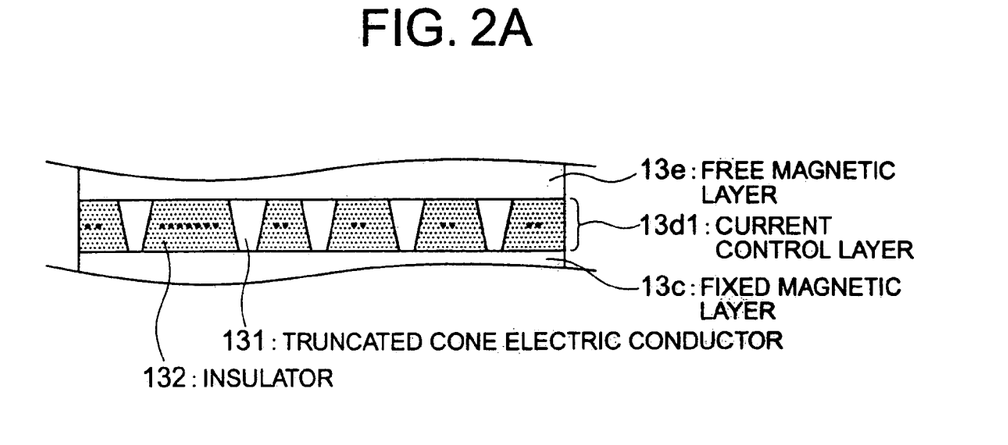
FIG. 2A and FIG. 2B are, respectively, schematic views showing examples of microstructure of a current control layer 13d shown in FIG. 1.
Figure 2B:
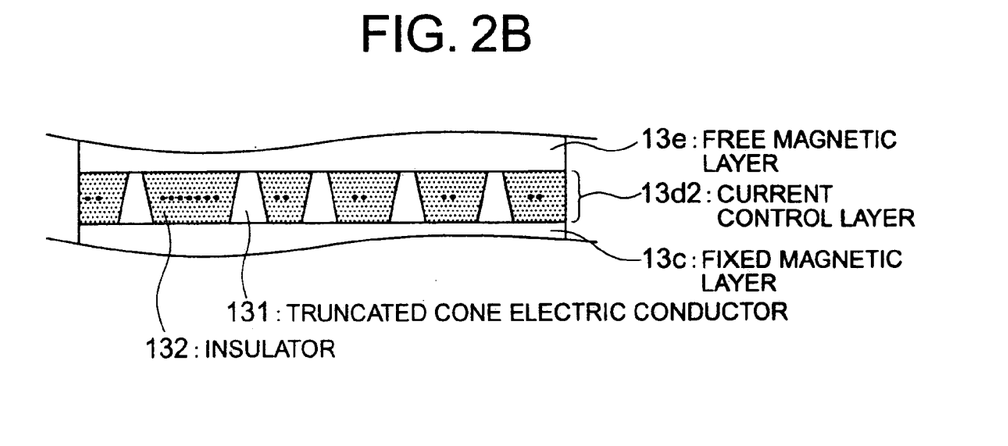

FIG. 2A and FIG. 2B respectively are schematic views showing examples of the microstructures of such a current control layer 13d. Note that in FIG. 2A and FIG. 2B the same reference numerals are assigned to the same portions as those in FIG. 1. Two examples shown in FIG. 2A and FIG. 2B are results from different manufacturing conditions. In a case of the current control layer 13d1 shown in FIG. 2A, respective electric conductors (copper) which are formed into columnar shapes have larger-area basal planes on an upper side in the drawing as the truncated cone electric conductor 131. In a case of the current control layer 13d2 shown in FIG. 2B, on the contrary, respective electric conductors (copper) which are formed into columnar shapes have larger basal planes on a lower side in the drawing as the truncated cone electric conductor 131. Incidentally, horizontal surroundings of these truncated cone electric conductor 131 are filled with the insulators 132 of alumina.

A difference shown in FIG. 2A and FIG. 2B arises because of different process conditions as described above. Depending on the conditions, directions of sides of the larger-area basal planes can vary and both types of conductors can be formed in a mixed way. For convenience, a surface on which the larger-area basal planes of the truncated cone electric conductors 131 is greater in number is called a first surface of the current control layer 13d1 (13d2). A surface of the other side is called a second surface of the current control layer 13d1 (13d2). In the case of FIG. 2A an upper side of the current control layer 13d1 is the first surface thereof, while in the case of FIG. 2B a lower side of the current control layer 13d2 is the first surface thereof.

Incidentally, such a microstructure can be verified by adjusting a sample piece of the manufactured magnetoresistance film 13 and observing it with for example a TEM (transmission electron microscope). In the example here, a width (diameter of the larger-area basal plane) of the truncated cone electric conductor 131 is approximately 2 nm, for example.

Back in FIG. 1, a connection polarity of the sense current source 23 to the CCP-CPP-GMR head 10 will be described. With regard to the connection polarity, in a case of the CCP-CPP-GMR head 10 having the current control layer 13d1 shown in FIG. 2A, a "+" of the sense current source 23 is connected to the lower electrode-and-shield layer 11, while a "−" of the sense current source 23 is connected to the upper electrode-and-shield layer 12. According thereto, in the current control layer 13d1, the sense current is made to flow from the second surface to the first surface.

In a case of the CCP-CPP-GMR head 10 having the current control layer 13d2 shown in FIG. 2B, the "−" of the sense current source 23 is connected to the lower electrode-and-shield layer 11, while the "+" of the sense current source 23 is connected to the upper electrode-and-shield layer 12. According thereto, in the current control layer 13d2, the sense current is also made to flow from the second surface to the first surface. The polarities of the sense currents according to the above are fixed and not reversed in use.

Hereinabove, the CCP-CPP-GMR head assembly according to the embodiment of the present invention is described with a focus on the structure thereof. Hereinafter, a reason that the polarities of the sense currents are fixed as above will be described.

Figure 3A:
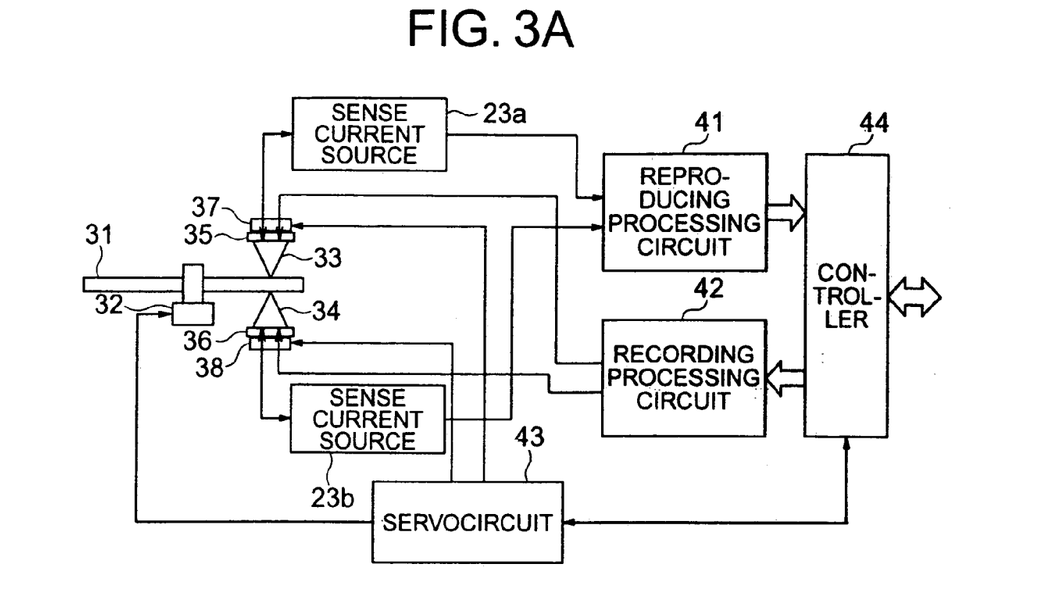
FIG. 3A and FIG. 3B are, respectively, block diagrams showing structures for evaluating a CCP-CPP-GMR head 10 output of the CCP-CPP-GMR head assembly according to the embodiment of the present invention.
Figure 3B:
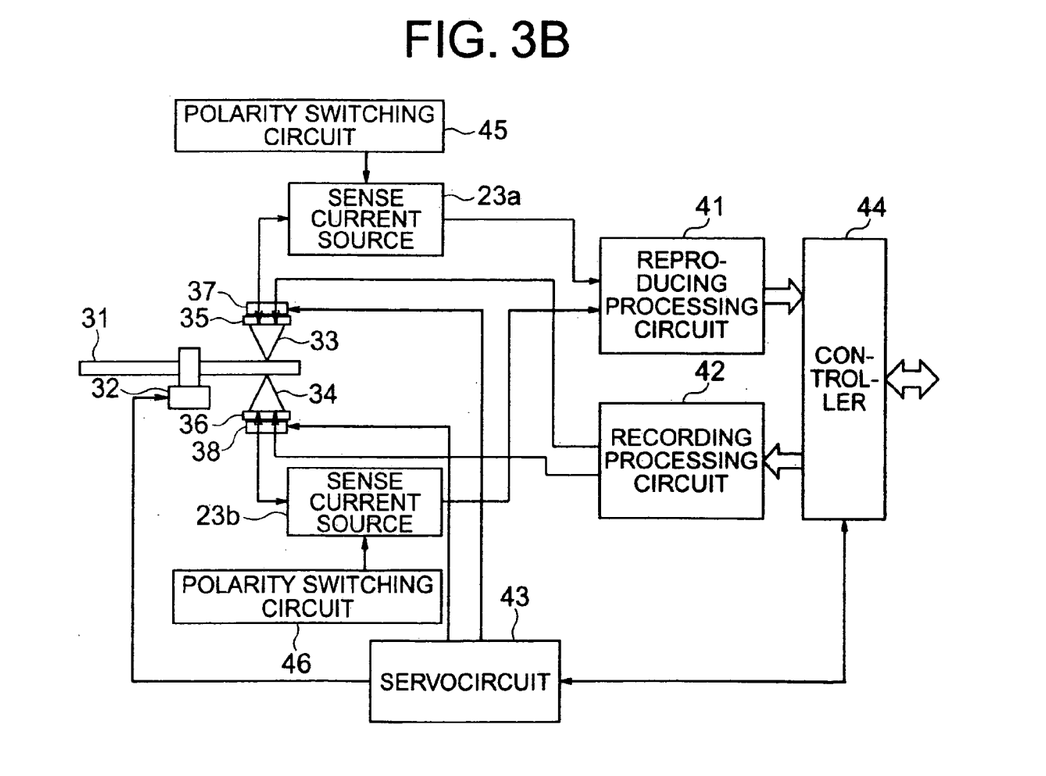

FIG. 3A and FIG. 3B respectively are block diagrams showing structures for evaluating a CCP-CPP-GMR head 10 output of the CCP-CPP-GMR head assembly according to the embodiment of the present invention. A difference between FIG. 3A and FIG. 3B is whether polarity switching circuits 45, 46 are provided or not for the respective sense current sources 23a, 23b. These are respectively structured by using existing magnetic disc apparatuses, adding the polarity switching circuits 45, 46, to one of the apparatuses, not adding them to the other, and mounting pairs of head assemblies 33, 34 as the above-described CCP-CPP-GMR head assemblies corresponding to the respective both surfaces of the media 31. By providing the polarity switching circuits 45, 46, in the structure shown in FIG. 3B, the polarities and the volumes of the sense currents can be easily varied in a state that the sense current sources 23a, 23b and the CCP-CPP-GMR heads 10 of the head assemblies 33, 34 are connected.

Incidentally, the structure shown in FIG. 3B is positioned as an experiment system. On the other hand, the structure shown in FIG. 3A is that of an existing magnetic disc apparatus on which the CCP-CPP-GMR head assemblies according to the embodiment of the present invention are mounted as the head assemblies 33, 34, and therefore is positioned as incomplete only in appropriateness of the sense current polarity. Excluding that the sense current polarities are not made appropriate, FIG. 3A is the drawing which can be used as a block diagram of the magnetic recording/reproducing apparatus according to an embodiment of the present invention.

Though the structures themselves as block diagrams shown in FIG. 3A and FIG. 3B are well known, hereinafter the structures will be described. As shown in FIG. 3A and FIG. 3B, the structures have the two pairs of the head assemblies 33, 34, the sense current sources 23a, 23b, the polarity switching circuits 45, 46, as well as the media (magnetic discs) 31, spindle motors 32, sliders 35, 36, voice coil motors 37, 38, reproducing processing circuits 41, recording processing circuits 42, servocircuits 43, and controllers 44.

The medium 31 is a disk-shaped recording medium in/from which data is written and read. To face the both surfaces of the medium 31, the respective head assemblies 33, 34 are disposed and the medium 31 is rotated by the spindle motor 32. The spindle motor 32 is rotated as desired by a signal from the servocircuit 43 according to a requirement of data writing/reading. Each of head assemblies 33, 34, being equivalent to the CCP-CPP-GMR head assembly according to the embodiment shown in FIG. 1 in terms of the head part, includes the CCP-CPP-GMR head 10 and the inductive write head 21. The respective head assemblies 33, 34 are disposed on the sliders 35, 36.

The respective sliders 35, 36 are movably disposed in a radial direction of the medium 31 by operation of the voice coil motors 37, 38. The voice coil motors 37, 38, by the signal from the servocircuit 43, operate on the sliders 35, 36 so that the head assemblies 33, 34 on the sliders 35, 36 face the desired position of the medium 31 according to the requirement of data writing/reading.

The reproducing processing circuit 41 processes a reproduced output from the CCP-CPP-GMR heads 10 of the head assemblies 33, 34 by the currents from the sense current sources 23a, 23b. The reproducing processing circuit 41 includes an equalizing circuit, a demodulation circuit, and the like. A regenerated signal is outputted to the outside via the controller 44. The recording processing circuit 42 processes data to be recorded which is inputted thereto from outside via the controller 44. The recording processing circuit 42 includes a modulation circuit, a recording amplifying circuit, and the like. A recorded signal is led to the inductive write head 21 of the head assemblies 33, 34.

The servocircuit 43 generates and outputs signals for rotation controlling the spindle motor 32 and for displacement controlling the voice coil motors 37, 38. For this purpose, signals from the outside via the controller 44 and a part of signals included in the reproduced output are provided thereto. Also, as necessary, the servocircuit 43 provides the controller 44 with a signal showing an operational state as the servocircuit 43. According thereto, in the reproducing processing and the recording processing, the CCP-CPP-GMR head or the inductive write head of the head assemblies 33, 34 is positioned at a predetermined position above the medium 31. The spindle motor 32, the voice coil motors 37, 38, and the servocircuit 43, respectively, are parts of a servomechanism.

The controller 44 controls the entire apparatus and includes at leas a CPU (central processing unit). The controller 44 is in charge of controlling input/output of the signals to be recorded and the regenerated signals, operation controlling the servomechanism, and the like.

Evaluation of the CCP-CPP-GMR head 10 output by using the magnetic disc apparatus with the above-described structures is conducted as follows. That is, by the inductive write heads 21 of the head assemblies 33, 34, criterial data is written on the medium 31, and this criterial data is read by the CCP-CPP-GMR heads 10 of the head assemblies 33, 34. Then, the output thereof is evaluated in terms of a signal level and a noise level.

Figure 4A:
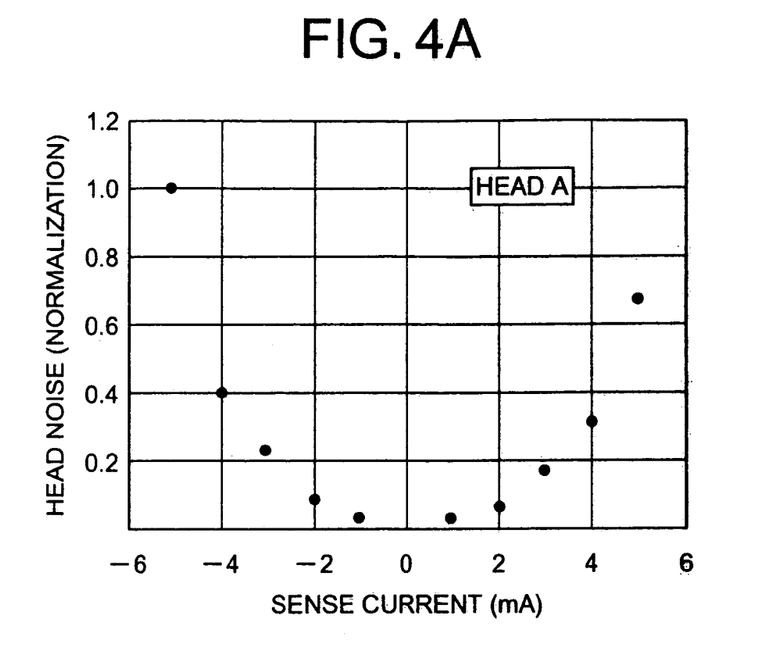
FIG. 4A and FIG. 4B are, respectively, graphs showing examples of measured results of output noise levels of head assemblies 33, 34 which include the CCP-CPP-GMR head 10 according to the embodiment of the present invention.
Figure 4B:
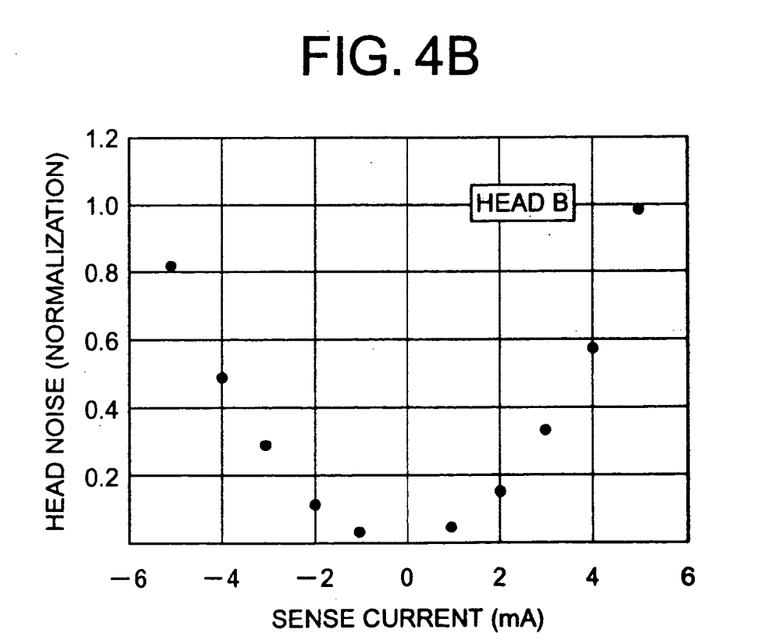

Two types (head A, head B) of the CCP-CPP-GMR heads 10, which have different process conditions at times of manufacturing are prepared. Resistance values (nominal values) thereof are both 40Ω. It is verified by observation with the TEM that the microstructures of the current control layers 13d of these heads A, B correspond to those shown in FIG. 2A and FIG. 2B respectively. Head assemblies 33, 34 are built up with these respective heads being included, and applied to the experiment system of the structure shown in FIG. 3B. Then, the noise levels of the output signals of reading, with values and polarities of sense currents being varied, are evaluated. The results are shown in FIG. 4A and FIG. 4B. FIG. 4A and FIG. 4B, respectively, are graphs showing measured result examples of output noise levels of the head assemblies 33, 34 which include the CCP-CPP-GMR heads 10 according to the embodiment of the present invention.

As shown in FIG. 4A and FIG. 4B, it is noticed that the head A and the head B have opposite characteristics in terms of the polarity of the sense current. More specifically, the head A has smaller noise levels in general in a "+" sense current than in a "−" sense current, while the head B has smaller noise levels in general in the "−" sense current than in the "+" sense current. Here, the "+" of the sense current is the polarity in a case that the electric current flows from a lower electrode-and-shield layer 11 side to an upper electrode-and-shield layer 12 side in FIG. 1.

From the above, it is noticed that when the sense current having the polarity in which smaller noise levels are observed is given, in relation to the microstructure of the current control layer 13d1 or 13d2, the sense current flows from the second surface to the first surface of the current control layer 13d1 or 13d2. Incidentally, values of the sense currents in FIG. 4A and FIG. 4B are varied to include the range of values which can be actually used.

Next, as a suitable value of the sense current the value of the sense current is set to be +3.5 mA (or −3.5 mA). With regard to a case that this set value is applied and the head A or the head B is mounted on the structure system shown in FIG. 3A or FIG. 3B, evaluation results thereof will be described. Evaluation objects are output signal levels at a time that data recorded in the medium 31 is read.

Figure 5:
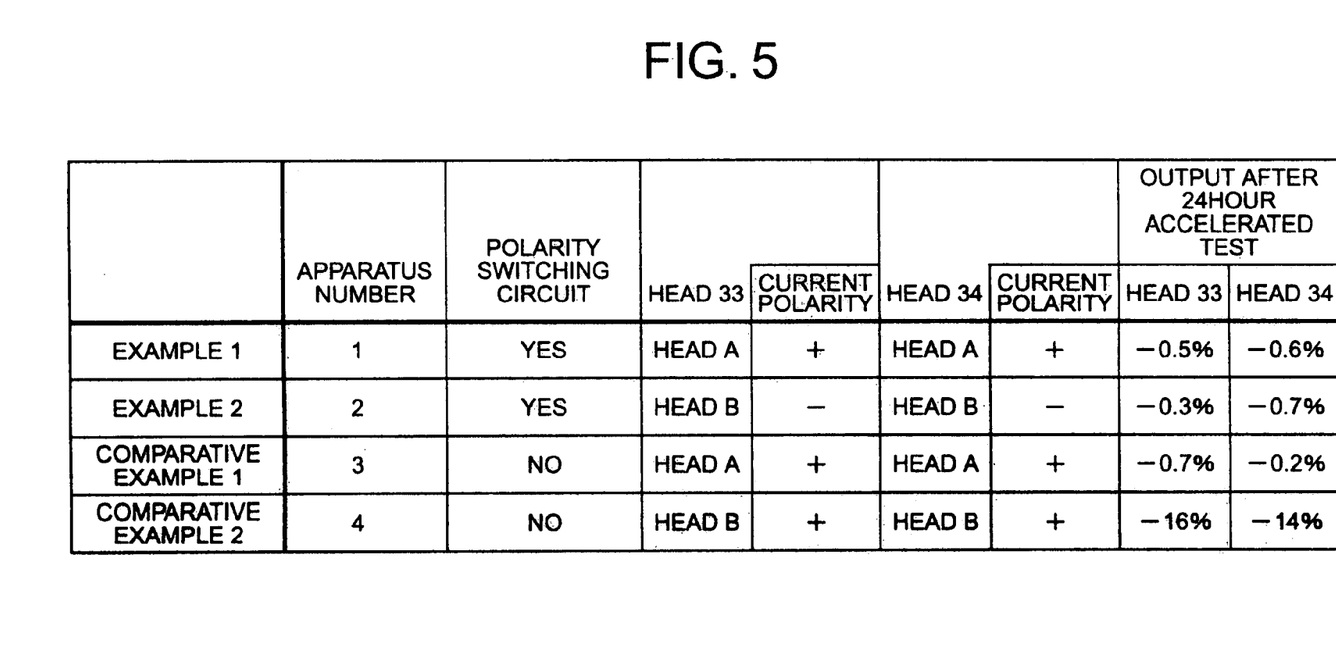
FIG. 5 is a data chart showing transitions of how output signal levels after an accelerated test change by varying the head and varying a sense current polarity to the head.

FIG. 5 shows one of the results thereof. In FIG. 5, a field of "apparatus number" indicates numbers for the magnetic disc apparatuses on which the heads A, B are mounted. "Yes" and "no" of a field of "polarization switching circuit" respectively correspond to FIG. 3B and FIG. 3A. Additionally, a next field shows which one of heads A, B is mounted as the head 33 and the head 34, and also current polarities thereof are shown. Unless the polarity is altered by the polarity switching circuit, the sense current polarities are set to be "+" in this magnetic disc apparatus. A field of "output after 24 hour accelerated test" shows comparisons of output signal levels after the magnetic disc apparatuses are kept in a constant temperature bath of 130° C. for 24 hours (or, after accelerated tests) with output signal levels before being put in the constant temperature bath.

As noticed from these results, only in a magnetic disc apparatus (comparative example 2) mounting the heads B as both the heads 33, 34, of which the sense current polarities are "+", the output levels of both the heads 33, 34 are significantly deteriorated after the accelerated test. This result corresponds to the fact that only in the magnetic disc apparatus of the comparative example 2 the sense currents flow from the first surfaces to the second surfaces of the current control layers 13$d$ (13$d$2) in both the heads 33, 34. In the heads 33, 34 of all the other magnetic disc apparatuses (example 1, example 2, comparative example 1), the sense currents flow from the second surfaces to the first surfaces of the current control layers 13$d$1 or 13$d$2.

Therefore, it is noticed that the CCP-CPP-GMR head can be used without problems in terms of operating life when the sense current flows from the second surface to the first surface of the current control layer in the definition above. Additionally, judgment of which surface corresponds to the first surface can be done by the evaluation of the output signal noise levels as shown in FIG. 4, in addition to by the observation with the TEM.

More specifically, first the CCP-CPP-GMR head is provided with a sense current of a certain polarization to measure the noise level. Next, the CCP-CPP-GMR head is provided with a sense current of a reverse polarization to measure the noise level. Lastly, the noise level in the first polarization and the noise level in the second polarization are compared and a direction of the sense current with the polarization which gives the smaller noise level between the noise levels of the both is specified to be an appropriate sense current direction. Such evaluation of the noise level is advantageous in that the appropriate sense current direction of the CCP-CPP-GMR head can be specified with ease in non-destructive way (i.e., without conducting an operating life test or analyzing/specifying the microstructure by adjusting the sample piece).

Figure 6:
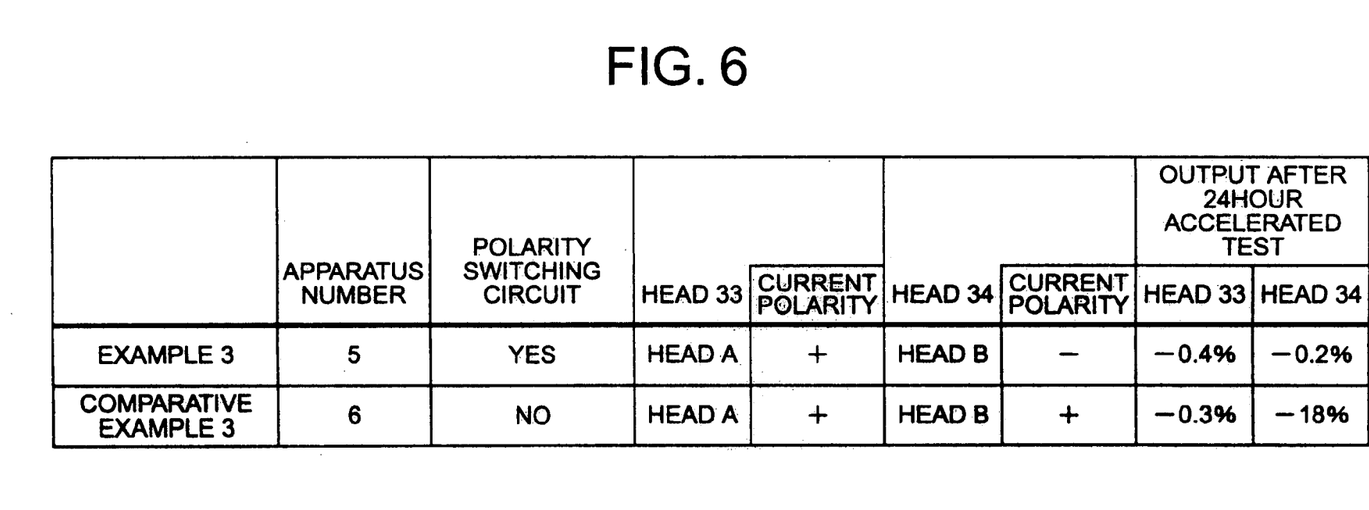
FIG. 6 is a data chart showing transitions of how output signal levels after the accelerated test change by varying the head and varying the sense current polarity to the head in a different way from that of the case shown in FIG. 5.

FIG. 6 is a chart showing another result which differs from the result shown in FIG. 5. The way to read the chart is the same as that for FIG. 5. FIG. 6 shows a case that the head A and the head B are mixed-mounted as the heads 33, 34 of one magnetic disc apparatus. Incidentally, values of the sense currents are +3.5 mA or −3.5 mA as in the above case. This case shows, without contradicting with the result shown in FIG. 5, that only in the head 34 of the comparative example 3, in which the head B is given the sense current of the "+" polarity, the output levels after the 24 hour accelerated test are significantly deteriorated. FIG. 6 shows that the head A and the head B can be mixed-loaded on the magnetic disc apparatus without problems if the sense current polarities are appropriate.

Here, the head A and the head B are formed under process conditions which are intentionally differentiated. However, because of an unintentional alteration in the condition, the microstructure of the current control layer 13$d$ of the manufactured CCP-CPP-GMR head 10 can be changed. Also in such a case, by conducting the observation with the TEM, the evaluation of the noise level or the like, the appropriate sense current polarity can be specified. Also, it is also possible, though primitive, to select two samples among the plural CCP-CPP-GMR heads which are manufactured in lots and conduct the accelerated tests by respectively giving the sense currents of the different polarities, choosing the polarity of lesser deterioration in the output level to specify the appropriate sense current polarity for the lot.

Figure 7:
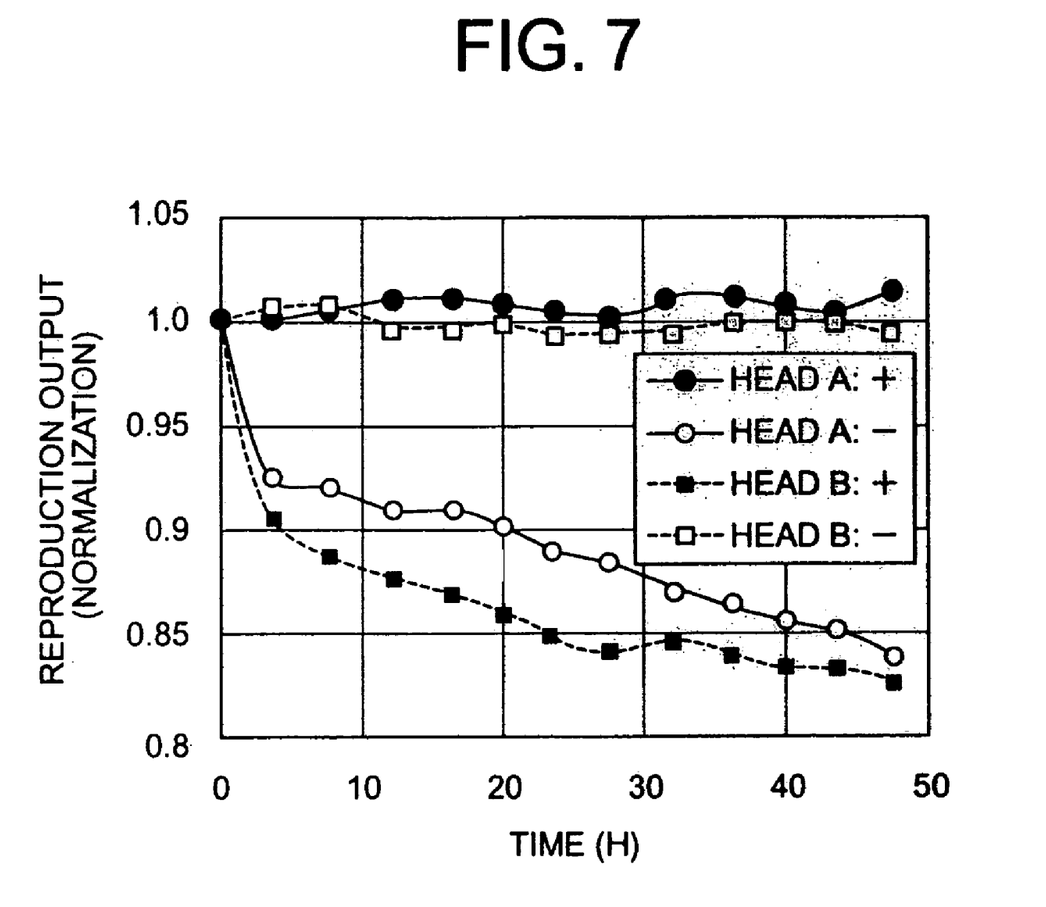
FIG. 7 is a graph showing transitions of how output signal levels during the accelerated test change by varying the head and varying the sense current polarity to the head.

FIG. 7 is a chart showing an example of measuring transitions of the output signal levels in more detail and in chorological order under the condition of the accelerated tests shown in FIG. 5 and FIG. 6. As the experiment system, the structure shown in FIG. 3B is used. A result thereof does not contradict with the results described above, and the deterioration (change) of the output levels cannot be recognized respectively in the head A with the sense current of the "+" polarity or in the head B with the sense current of the "−" polarity. Degrees of change thereof are all within 1%, showing that the heads have satisfactory operating life characteristics. In the reverse polarity, respective output signal levels are significantly deteriorated.

The present invention is not limited to the specific aspects described here with the illustrations, but it is to be understood all the changes and modifications without departing from the range of the following claims are to be included therein.

What is claimed is:

1. A CCP-CPP-GMR head assembly, comprising:
   a CCP-CPP-GMR head which includes at least a current control layer having as a microstriicture a plurality of truncated cone electric conductors with axes substantially the same as a current direction and an insulator filling between the plurality of truncated cone electric conductors, and in which a surface on which a larger-area basal plane of the plurality of truncated cone electric conductors is greater in number is a first surface of the current control layer and a surface of an opposite side of the first surface is a second surface of the current control layer; and
   a sense current source providing the CCP-CPP-GMR head with a sense current so that the sense current flows from the second surface to the first surface of the current control layer.

2. The CCP-CPP-GMR head assembly as set forth in claim 1,
   wherein, in the CCP-CPP-GMR head, the truncated cone electric conductor of the current control layer is made of Cu (copper), and the insulator of the current control layer is made of alumina.

3. The CCP-CPP-GMR head assembly as set forth in claim 1, further comprising an inductive write head distantly disposed in a vertical direction against the electric control layer of the CCP-CPP-GMR head.

4. A magnetic recording/reproducing apparatus, comprising:
   a CCP-CPP-GMR head which includes at least a current control layer having as a microstructure a plurality of truncated cone electric conductors with axes substantially the same as a current direction and an insulator filling between the plurality of truncated cone electric conductors, and in which a surface on which a larger-area basal plane of the plurality of truncated cone electric conductors is greater in number is a first surface of the current control layer and a surface of an opposite side of the first surface is a second surface of the current control layer;
   a sense current source providing the CCP-CPP-GMR head with a sense current so that the sense current flows from the second surface to the first surface of the current control layer;
   an inductive write head distantly disposed in a vertical direction against the current control layer of the CCP-CPP-GMR head;
   a reproducing processing circuit regenerating data read from a medium by the CCP-CPP-GMR head;
   a recording processing circuit recording data to be written in the medium by the inductive write head; and
   a servomechanism positioning the CCP-CPP-GMR head or the inductive write head to a predetermined position of the medium in regenerating and recording.

* * * * *